United States Patent
Kim et al.

(10) Patent No.: US 8,460,818 B2
(45) Date of Patent: Jun. 11, 2013

(54) BATTERY MODULE

(75) Inventors: Sung-Bae Kim, Yongin-si (KR);
Yong-Sam Kim, Yongin-si (KR);
Sang-Won Byun, Yongin-si (KR);
Hyo-Seob Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 215 days.

(21) Appl. No.: 12/872,252

(22) Filed: Aug. 31, 2010

(65) Prior Publication Data

US 2011/0081569 A1   Apr. 7, 2011

Related U.S. Application Data

(60) Provisional application No. 61/248,839, filed on Oct. 5, 2009.

(51) Int. Cl.
*H01M 2/22* (2006.01)

(52) U.S. Cl.
USPC .................. 429/158; 429/160; 29/623.4

(58) Field of Classification Search
USPC .................. 429/158, 159, 160; 29/623.4
See application file for complete search history.

(56) References Cited

U.S. PATENT DOCUMENTS

| | | | |
|---|---|---|---|
| 6,146,788 A | 11/2000 | Ikeda et al. | |
| 6,632,562 B1 * | 10/2003 | Nakatsuka et al. | 429/158 |
| 6,844,110 B2 | 1/2005 | Enomoto et al. | |
| 7,056,618 B2 * | 6/2006 | Hirano et al. | 429/157 |
| 7,575,148 B2 | 8/2009 | Kubouchi et al. | |
| 7,776,467 B2 | 8/2010 | Kato et al. | |
| 8,388,382 B2 | 3/2013 | Ikeda et al. | |
| 8,399,121 B2 | 3/2013 | Geshi et al. | |
| 2009/0123830 A1 | 5/2009 | Kato et al. | |
| 2010/0173178 A1 * | 7/2010 | Kim et al. | 429/1 |
| 2011/0081568 A1 | 4/2011 | Kim et al. | |

FOREIGN PATENT DOCUMENTS

| | | |
|---|---|---|
| CN | 101218697 A | 7/2008 |
| EP | 2 204 863 A1 | 7/2010 |
| JP | 11-120988 | 4/1999 |
| JP | 2002-151045 | 5/2002 |
| JP | 2002-358945 | 12/2002 |
| JP | 2003-19575 | 1/2003 |
| JP | 2003-77442 | 3/2003 |
| JP | 2004-055250 | 2/2004 |

(Continued)

OTHER PUBLICATIONS

Korean Office action dated Dec. 22, 2011 issued to corresponding Korean patent application No. 10-2010-0095324, 8 pages.

(Continued)

*Primary Examiner* — Stephen J. Kalafut
(74) *Attorney, Agent, or Firm* — Christie, Parker & Hale, LLP

(57) ABSTRACT

A battery module includes: a plurality of rechargeable batteries; and a connector for connecting a first terminal of one of the plurality of rechargeable batteries and including a first material, to a second terminal of another one of the plurality of rechargeable batteries and including a second material, wherein welded portions connect the connector to the first terminal and the second terminal, respectively, at least one of the welded portions including a nugget zone including a mixture of the respective materials of the connector and a corresponding one of the first terminal or the second terminal.

19 Claims, 5 Drawing Sheets

FOREIGN PATENT DOCUMENTS

| | | |
|---|---|---|
| JP | 2005-118877 | 5/2005 |
| JP | 2006-261083 | 9/2006 |
| JP | 2007-323952 | 12/2007 |
| JP | 2008-123800 | 5/2008 |
| JP | 2010-161075 | 7/2010 |
| JP | 2011-082164 | 4/2011 |
| KR | 2000-0068897 | 11/2000 |
| KR | 10-2008-0022129 | 3/2008 |

OTHER PUBLICATIONS

European Search Report dated Dec. 10, 2010, for corresponding European Patent application 10177827.2.

Patent Abstracts of Japan and English machine translation of Japanese Publication 2002-151045 listed above, 9 pages.

Hamedi, M., et al, *Numerical study of nugget formation in resistance spot welding*, International Journal of Mechanics, vol. 2, No. 1, (2008), pp. 11-15, XP-002611466.

EPO Office action for corresponding EP Application No. 10 177 827.2, dated Jun. 28, 2011, 3 pages.

Japanese Office action dated Aug. 14, 2012, for corresponding Japanese Patent application 2010-214114, (2 pages).

Patent Abstracts of Japan, and English machine translation of Japanese Publication 2004-055250 listed above, (10 pages).

SIPO Office action dated Feb. 20, 2013, for corresponding Chinese Patent application 201010291596.7, with English translation, (16 pages).

JPO Notice of Allowance dated Apr. 2, 2013, for corresponding Japanese Patent application 2010-214114, (1 page).

* cited by examiner

BATTERY MODULE

CROSS-REFERENCE TO RELATED APPLICATION

This application claims the benefit of U.S. Provisional Application No. 61/248,839, filed on Oct. 5, 2009, in the United States Patent and Trademark Office, the disclosure of which is incorporated herein in its entirety by reference.

BACKGROUND

1. Field

The following description relates to a battery module with electrically connected rechargeable batteries.

2. Description of Related Art

Rechargeable batteries can be charged and discharged. Small capacity rechargeable batteries are used for small portable electronic devices such as mobile phones, laptop computers, and camcorders, while large capacity batteries are used as power sources for driving motors of hybrid vehicles, etc.

High power battery modules using a high energy density non-aqueous electrolyte have been developed, and the high power battery modules are formed as large-capacity battery modules by connecting a plurality of rechargeable batteries in series to be used for driving the motors of electric vehicles, etc.

Further, one large capacity rechargeable battery is generally composed of a plurality of rechargeable batteries connected in series, in which the rechargeable battery may be formed in a cylindrical shape or a prismatic shape.

Prismatic rechargeable batteries include a case having an electrode assembly in which a positive electrode and a negative electrode are disposed with a separator therebetween, and a space where the electrode assembly is disposed, a cap plate sealing the case and having a terminal hole where an electrode terminal is inserted, and an electrode terminal that is electrically connected with the electrode assembly and protrudes outside the case through the terminal hole.

The electrode terminal is fixed to the cap plate by a nut, but the nut can be loosened by continuous external vibration or shock. This causes contact resistance inside the rechargeable batteries, such that the output and cycle-life of the rechargeable batteries are reduced.

A method of connecting a connecting member to the positive electrode and the negative electrode using resistance welding has been proposed.

In general, the positive electrode terminal is made of aluminum and the negative electrode terminal is made of copper. As such, it is difficult to form a connecting member using the same material as both the positive electrode terminal and the negative electrode terminal. When the connecting member is made of a different material from that of at least one of the positive electrode terminal or the negative electrode terminal, it is difficult to connect the connecting member to the terminals with different materials using resistance welding or ultrasonic welding.

The above information disclosed in this Background section is only for enhancement of understanding of the background of the invention and therefore it may contain information that does not form the prior art that is already known in this country to a person of ordinary skill in the art.

SUMMARY OF THE INVENTION

Exemplary embodiments of the present invention provide a battery module for easily and stably connecting a connecting member with terminals.

According to an exemplary embodiment of the present invention, a battery module includes: a plurality of rechargeable batteries; and a connector for connecting a first terminal of one of the plurality of rechargeable batteries and including a first material, to a second terminal of another one of the plurality of rechargeable batteries and including a second material, wherein welded portions connect the connector to the first terminal and the second terminal, respectively, at least one of the welded portions including a nugget zone including a mixture of the respective materials of the connector and a corresponding one of the first terminal or the second terminal.

At least one of the welded portions may be formed by friction stir welding.

The first material may include aluminum. The second material may include copper. The connector may include the first material or the second material. The first material and the second material may be different.

The welded portions may include at least one spot weld connecting the connector to the first terminal and at least one more spot weld connecting the connector to the second terminal.

The first terminal, the second terminal, and the connector may be plate shaped.

The connector may be positioned on the first terminal and the second terminal. The welded portions may include spot welds formed from a side of the connector opposite a side facing the first terminal and the second terminal. The connector may be in contact with the first terminal and the second terminal, and the welded portions may each be formed in a line where the connector and one of the first terminal or the second terminal are in contact.

At least one of the first terminal or the second terminal may include a protrusion, and the connector may include a groove sized to receive the protrusion. The welded portions may include spot welds formed from a side of the connector opposite a side facing the first terminal and the second terminal. A corresponding one of the spot welds may be aligned with the protrusion and the corresponding groove. The nugget zone may be formed by melding of the connector with the protrusion while in a solid state to form a melded portion, and dynamic recrystallization of the melded portion.

The nugget zone may be formed by melding of the connector with the corresponding one of the first terminal or the second terminal while in a solid state to form a melded portion, and dynamic recrystallization of the melded portion. The battery module may further include a thermo-mechanically affected zone around the nugget zone and formed by plastic deformation and partial recrystallization of the connector with the corresponding one of the first terminal or the second terminal, and a heat affected zone around the thermo-mechanically affected zone and having slanting crystals and air holes.

The welded portions may each include a surface and a welding groove recessed from the surface.

The connector may contact the corresponding one of the first terminal or the second terminal, wherein the nugget zone traverses the contacting surfaces between the connector and the corresponding one of the first terminal or the second terminal.

According to another exemplary embodiment of the present invention, a method of connecting a first terminal of a first rechargeable battery with a second terminal of a second rechargeable battery, includes: providing a connector including a material different than a material of one of the first terminal or the second terminal; and welding the connector to the first terminal and the second terminal, respectively, to form respective welded portions, wherein the welded portion between the connector and the one of the first terminal or the second terminal is formed by friction stir welding.

The friction stir welding may form a nugget zone including a mixture of the respective materials of the connector and the one of the first terminal or the second terminal, by melding of the connector with the one of the first terminal or the second terminal while in a solid state to form a melded portion, and dynamic recrystallization of the melded portion.

According to exemplary embodiments of the present invention, with a decrease in contact resistance, the output of the battery module can be improved, and the cycle-life of the rechargeable batteries can also be improved.

Figure 1:
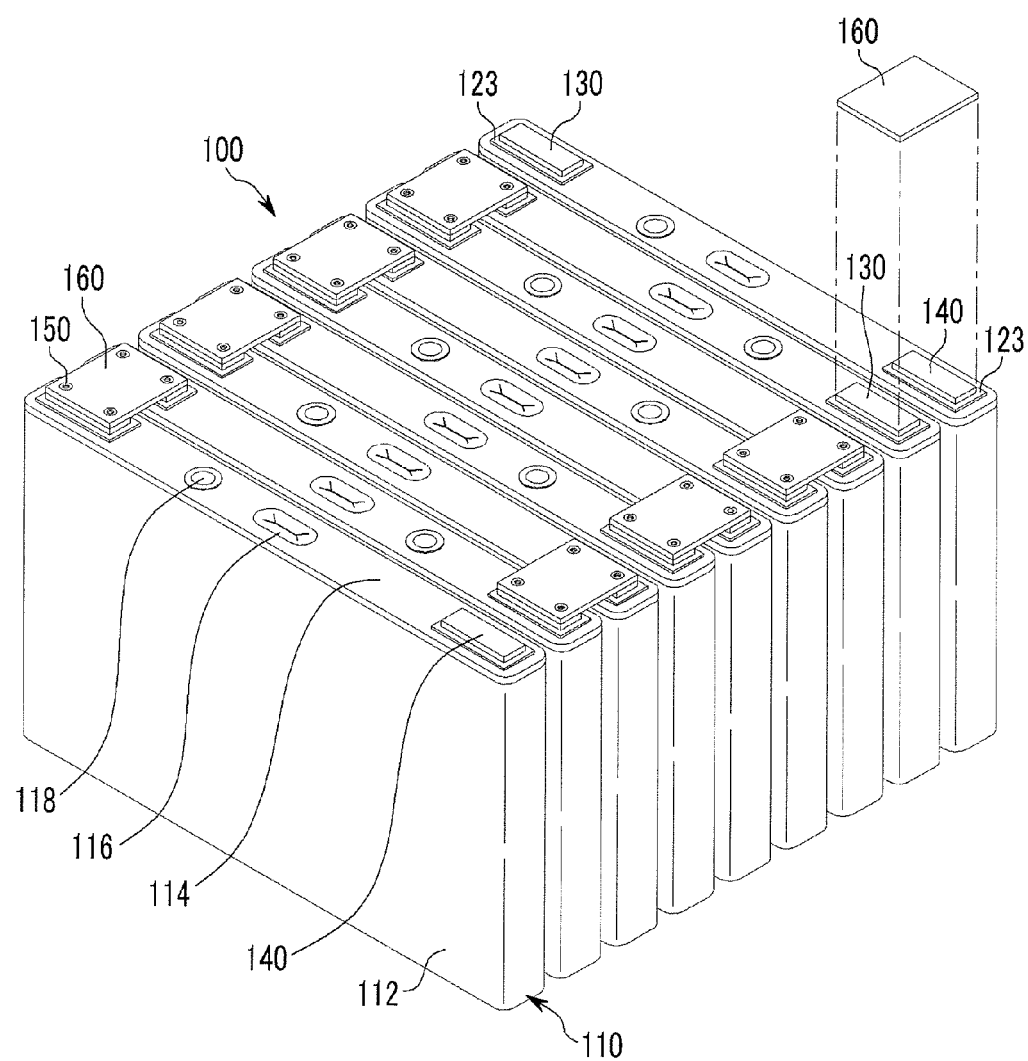
FIG. 1 is a perspective view showing a battery module according to a first exemplary embodiment of the present invention.

| Description of Reference Numerals Indicating Features in the Drawings | | | |
|---|---|---|---|
| 100: | rechargeable battery | 120: | cap plate |
| 100, 100', 200: | battery module | 110, 210: | rechargeable battery |
| 112: | case | 114: | cap plate |
| 116: | vent member | 118: | sealing cap |
| 130, 230: | positive electrode terminal | 140, 240: | negative electrode terminal |
| 150. 175, 250: | welded portion | 151, 251: | welding groove |
| 152. 252: | nugget zone | 160, | connecting member |
| 154, 254: | thermo-mechanically affected zone | 170, 260: 181, 271: | shank |
| 156, 256: | heat affected zone | 183, 273: | shoulder |
| 180, 270: | tool | 265: | support groove |
| 182, 272: | pin | | |
| 235, 245: | terminal protrusion | | |

DETAILED DESCRIPTION

In the following detailed description, exemplary embodiments of the present invention have been shown and described by way of illustration. As those skilled in the art will recognize, the described embodiments may be modified in various different ways without departing from the spirit or scope of the present invention. Accordingly, the drawings and description are to be regarded as illustrative in nature and not restrictive. Like reference numerals designate like elements throughout the specification.

Figure 2:
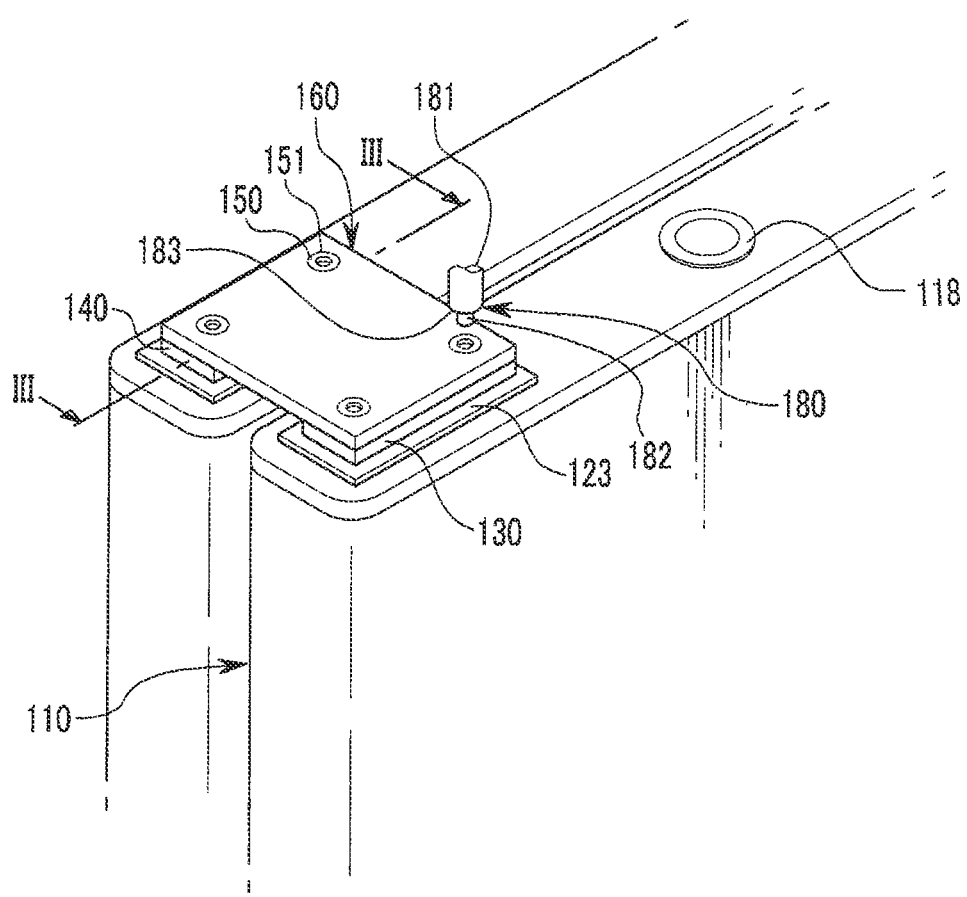
FIG. 2 is a partial perspective view of the battery module according to the first exemplary embodiment of the present invention.

FIG. 1 is a perspective view of a battery module according to a first exemplary embodiment of the present invention, and FIG. 2 is a partial perspective view of the battery module according to the first exemplary embodiment of the present invention.

Referring to FIG. 1 and FIG. 2, a battery module 100 according to the first exemplary embodiment includes a plurality of rechargeable batteries 110 having a positive electrode terminal 130 and a negative electrode terminal 140, and connecting members 160 that electrically connect the rechargeable batteries 110.

The battery module 100 according to the present exemplary embodiment is formed by connecting the rechargeable batteries 110 in series. However, the present invention is not limited thereto, and the rechargeable batteries 110 may, for example, be connected in parallel.

The rechargeable battery 110 according to the present exemplary embodiment is in a prismatic shape and includes a case 112, a cap plate 114 connected to the opening of the case 112, and the positive electrode terminal 130 and the negative electrode terminal 140 that protrude outside the case 112. Although the prismatic rechargeable battery is exemplified in the present exemplary embodiment, the present invention is not limited thereto, and the battery may be, for example, in a cylindrical shape or other shapes.

The terminals 130 and 140 are fixed to the cap plate 114 while protruding outside the cap plate 114, and a gasket 123 is between the cap plate 114 and each of the terminals 130 and 140 for insulation and sealing. In some embodiments, the positive electrode terminal 130 and the negative electrode terminal 140 are substantially plate shaped, and are electrically connected to an electrode assembly (not shown) inserted in the case 112. Further, in some embodiments, the positive electrode terminal 130 is made of aluminum and the negative electrode terminal 140 is made of copper.

A vent member 116 that is opened when an internal pressure increases and a sealing cap 118 that seals an electrolyte injection inlet may also be disposed on the cap plate 114.

The rechargeable batteries 110 arranged adjacent to each other are connected in series by the connecting members 160, in which the positive electrode terminals 130 and the negative electrode terminals 140 of adjacent rechargeable batteries 110 are alternately disposed and the connecting members 160 are welded to the positive electrode terminal 130 of one rechargeable battery 110 and the negative electrode terminal of an adjacent rechargeable battery 110.

The connecting member 160 is formed in a plate shape and disposed on the positive electrode terminal 130 and the negative electrode terminal 140 to cover the positive electrode terminal 130 and the negative electrode terminal 140. The connecting member 160 is bonded to at least one of the positive electrode terminal 130 and the negative electrode terminal 140 by friction stir welding.

With the connecting members 160 covering the terminals 130 and 140, a welded portion 150 is formed. For friction stir welding, a tool 180 is rotated to recrystallize the structure using dynamic flow, to weld the connecting member 160 with either the terminal 130 or 140. The tool 180 has a pin 182 and a shank 181 where the pin 182 is fixed, and the cross-section where the pin 182 protrudes from the shank 181 is called a shoulder 183.

In the present embodiment, the connecting member 160 and the terminals 130 and 140 are bonded by spot welding, in which a portion where the shoulder 183 contacts the connecting member 160 is a welded portion 150 and a welding groove 151 is formed at a portion where the pin 182 was positioned in the welded portion 150.

Figure 3:
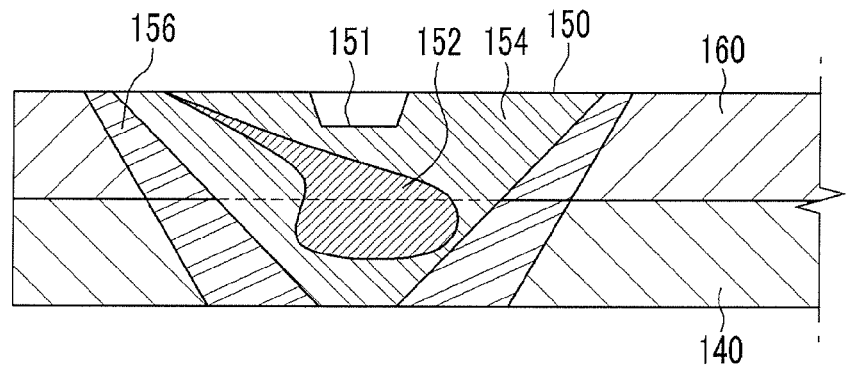
FIG. 3 is a cross-sectional view taken along the line III-III of FIG. 2.

As shown in FIG. 3, a nugget zone 152 that is formed by dynamic recrystallization, a thermo-mechanically affected zone (TMAZ) 154, and a heat affected zone (HAZ) 156 are formed in the welded portion 150.

The nugget zone 152 is a region where recovery and recrystallization occur due to high heat and the amount of deformation, such that the nugget zone 152 can also be referred to as a dynamic-recrystallized portion. Unlike general welding in which melting occurs by heat, the nugget zone 152 is formed by dynamic recrystallization of a material melded in a solid state by friction heat and stirring. The diameter of the nugget zone 152 is larger than the diameter of the pin 182 and smaller than the diameter of the shoulder 183. The size of the nugget zone 152 can vary corresponding to the rotational speed of the tool, where when the rotational speed is high, the size of the nugget zone 152 is reduced. When the rotational speed is too high, the shape of the crystal is incomplete and defects may occur at the incomplete portion.

The thermo-mechanically affected zone 154 is a region where partial recrystallization occurs by plastic deformation caused by friction at a contact surface where the shoulder 183 of the tool contacts the connecting member 160, and where thermal deformation by friction and mechanical deformation by the shoulder 183 occur substantially simultaneously. Crystals softened by excessive plastic flow and deformation of the material are distributed at an angle in the thermo-mechanically affected zone 154.

The heat affected zone 156 is more affected by heat than the thermo-mechanically affected zone 154. Here, slanting crystals may exist and a plurality of air holes may be formed.

When the connecting member 160 is bonded to at least the terminals made of different materials by friction stir welding, as in the present exemplary embodiment, the negative electrode terminal 140 made of copper and the positive electrode terminal 130 made of aluminum can be more effectively bonded using the connecting member 160 made of aluminum. Copper and aluminum have different melting points, such that when they are bonded by resistance welding or ultrasonic welding there is high possibility that defects can occur in the corresponding welded portion, or the welded portion may be more easily separated by external shock or vibration. In particular, when a battery module is used in electric vehicles or hybrid electric vehicles, vibration is applied continuously to the connecting member 160, such that the continuous vibration can cause contact defects between the connecting member 160 and the terminals 130 and 140.

However, when the connecting member 160 is bonded to the terminals 130 and/or 140 by friction stir welding, as in the present exemplary embodiment, solid-state bonding is achieved such that the connecting member 160 and the terminals 130 and/or 140 which have different melting points can be more stably bonded. Accordingly, not only can the output of the battery module 100 be improved, but the bonds between the connecting member 160 and the terminals 130 and/or 140 can be improved, such that the overall cycle-life of the battery module 100 can also be improved.

In particular, the nugget zone 152 is an area where dynamic recrystallization occurs, such that it has a structure that resists external vibration or shock. The thermo-mechanically affected zone 154, which is an area where two connecting members 160 and the terminals 130 and 140 have been rotated and bonded, has mixed parent metals, such that it has a structural characteristic that resists external shock and vibration.

Friction stir welding does not need a heat source, a welding rod, or filler metal, unlike other types of welding, such that it is an environment-friendly type of welding that does not discharge harmful light or substances. Further, since dynamic recombination occurs, solidification cracks that may be formed in, for example, fuse bonding may be minimized or reduced, and there is not much deformation, such that mechanical properties are excellent.

Figure 4:
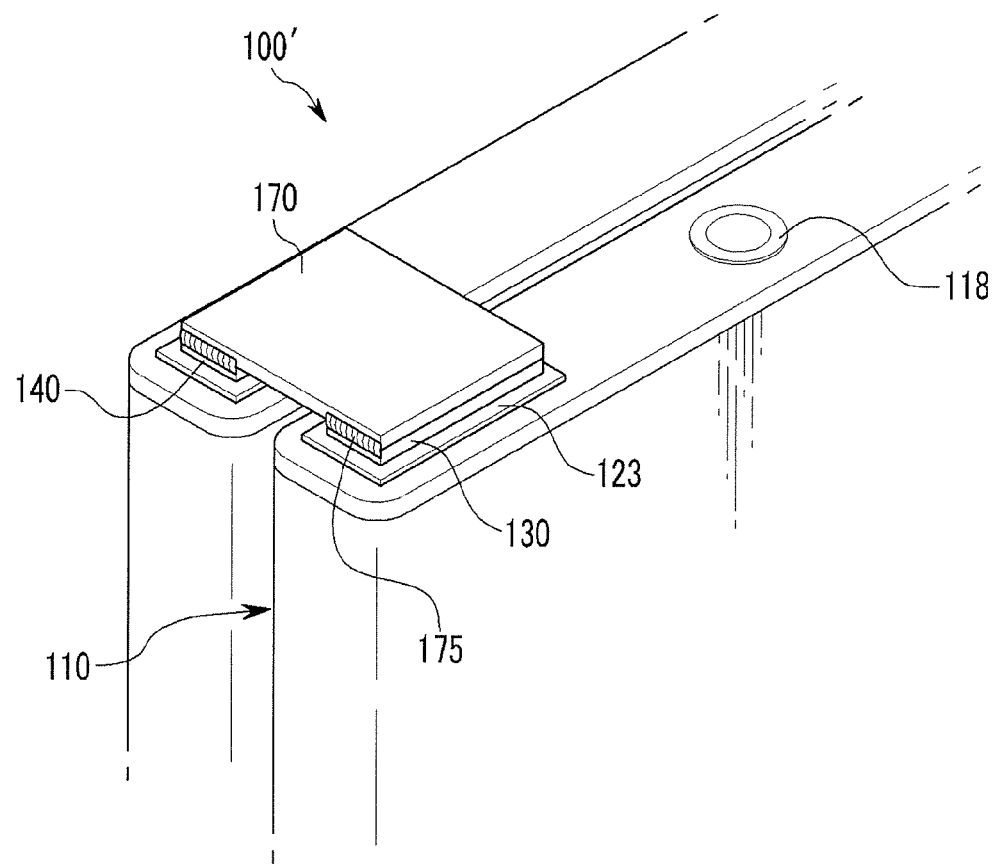
FIG. 4 is a perspective view showing a portion of a battery module according to a second exemplary embodiment of the present invention.

FIG. 4 is a perspective view showing a battery module according to a second exemplary embodiment of the present invention.

Referring to FIG. 4, a battery module 100' according to the second exemplary embodiment includes a plurality of rechargeable batteries 110 and connecting members 170 electrically connecting the rechargeable batteries 110. The battery module 100' according to the second exemplary embodiment has a similar structure as the battery module 100' according to the first exemplary embodiment, except for the configuration of the welding portion 175. Accordingly, repeated descriptions of similar configurations will not be provided.

In this embodiment, the rechargeable battery 110 has a positive electrode terminal 130 and a negative electrode terminal 140 that are plate shaped and protrude outside a case. The connecting member 170 is formed substantially as a rectangular plate and covers the positive electrode terminal 130 and the negative electrode terminal 140. The connecting member 170 is bonded to at least one of the positive electrode terminal 130 or the negative electrode terminal 140 by friction stir welding, and a welded portions 175 are formed at the sides of the connecting member 170 and the terminals 130 and 140.

The connecting member 170 and the terminals 130 and 140 are welded with the sides contacting each other, and a tool performs welding while moving along the sides of the terminals 130 and/or 140, such that the welded portion 175 is formed in a line.

By welding the sides of the connecting member 170 and the terminals 130 and/or 140 made of different materials using friction stir welding as in the present exemplary embodiment, different metals can be more stably bonded.

Figure 5:
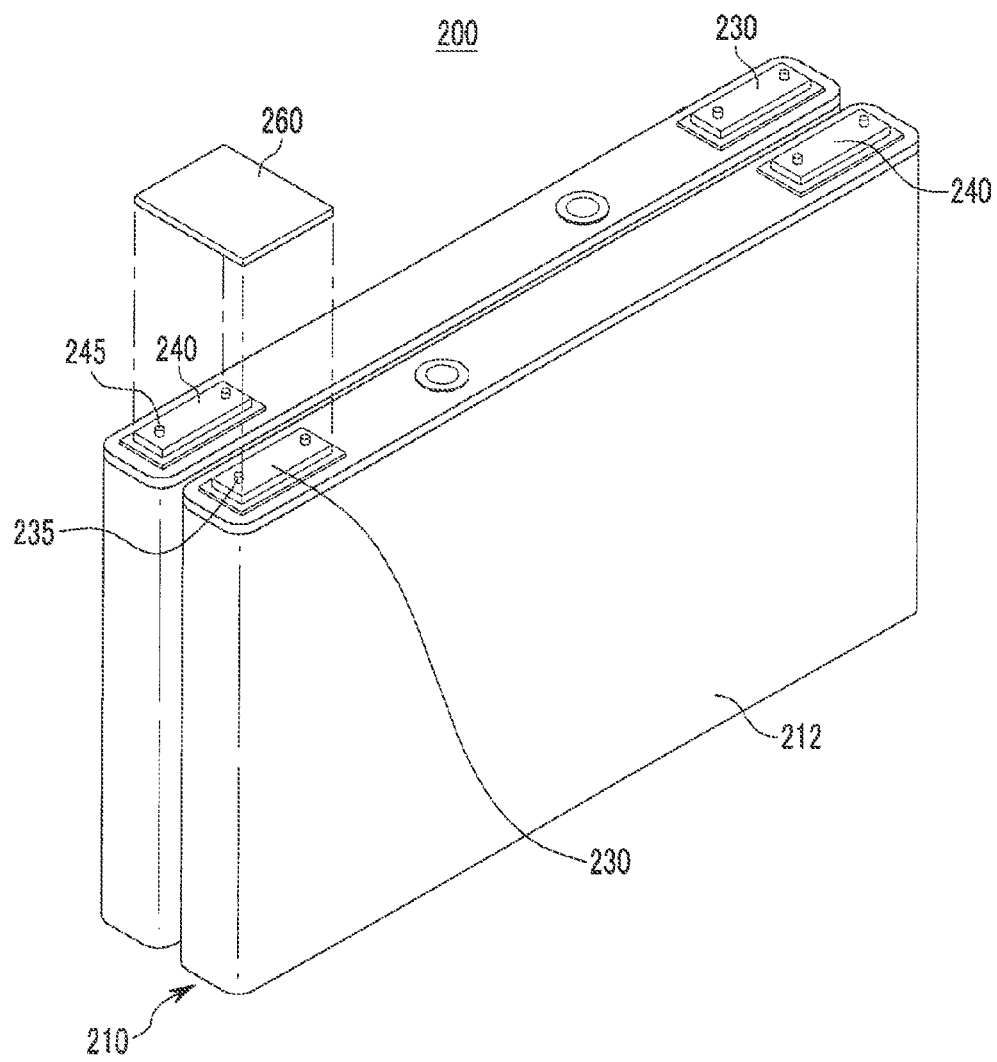
FIG. 5 is an exploded perspective view showing a portion of a battery module according to a third exemplary embodiment of the present invention.
Figure 6A:
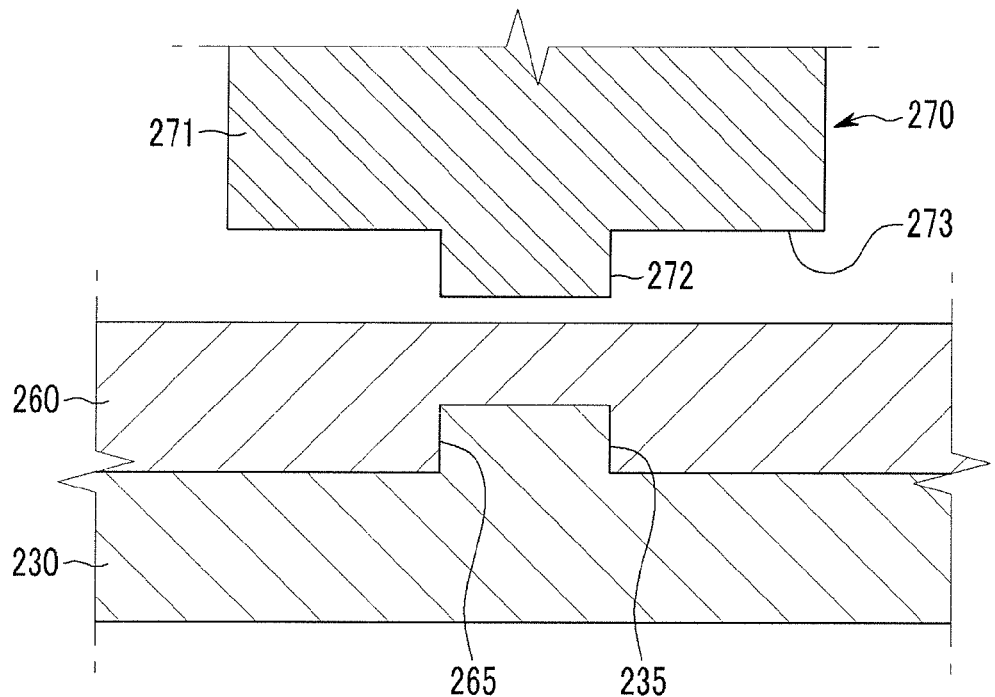
FIG. 6A and FIG. 6B are cross-sectional views illustrating a process of welding a connecting member with a terminal of the battery module according to the third exemplary embodiment of the present invention.
Figure 6B:
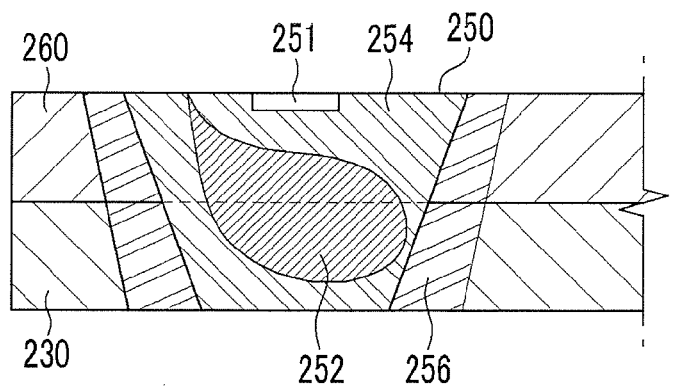

FIG. 5 is an exploded perspective view showing a battery module according to a third exemplary embodiment of the present invention, and FIG. 6A and FIG. 6B are cross-sectional views illustrating a process of welding a terminal and a connecting member according to the third exemplary embodiment of the present invention.

Referring to FIG. 5, FIG. 6A and FIG. 6B a battery module 200 according to the third exemplary embodiment includes a plurality of rechargeable batteries 210 and connecting members 260 electrically connecting the rechargeable batteries 210. The battery module 200 according to the third exemplary embodiment has a similar structure as the battery module according to the first exemplary embodiment, except for the structure of terminals 230 and 240 and the connecting member 260. Accordingly, repeated descriptions for similar configurations will not be provided.

The rechargeable battery 210 has a positive electrode terminal 230 and a negative electrode terminal 240 that are plate shaped and protrude outside a case 212.

In one embodiment, two terminal protrusions 235 are on an upper surface of the positive electrode terminal 230, and two terminal protrusions 245 are on an upper surface of the negative electrode terminal 240. Some embodiments may have more or less than two terminal protrusions on each electrode terminal.

The connecting member 260 is formed substantially in a rectangular plate and covers the positive electrode terminal 230 and the negative electrode terminal 240. Further, support grooves 265 are located on the lower surface of the connecting member 260, and the terminal protrusions 235 and 245 of the terminals 230 and 240 are inserted in the support grooves 265.

As shown in FIG. 6A and FIG. 6B, in this state, the connecting member 260 and at least one of the terminals 230 or 240 are bonded by friction stir welding using a tool 270. Here, terminal 230 is illustrated for convenience, but terminal 240 can be similarly configured. The tool 270 has a pin 272 and a shank 271, and is positioned above the connecting member 260. The pin 272 protrudes from a shoulder 273 at a lower end of the shank 271. By pressing the tool 270 against the connecting member 260 and either of the terminals 230 or 240 and rotating the tool 270, the connecting member 260 and a corresponding one of the terminals 230 or 240 are bonded in a solid state by friction heat and stirring. Accordingly, a welded portion 250 and a welding groove 251 are formed.

In this state, since the terminal protrusion 235 in FIG. 6A is inserted in the support grooves 265, as the terminal protrusion 235 is stirred, the terminal 230 and the connecting member 260 are stably bonded. Here, even if heat and friction force cannot influence or reach the lower portions of the terminal 230, the terminal protrusion 235 is dynamically recombined with the connecting member 260 by the heat and friction force, such that the connecting member 260 and the terminal 230 can be stably bonded.

A nugget zone 252 that is formed by dynamic recrystallization, a thermo-mechanically affected zone 254 where partial recrystallization is generated by plastic deformation, and a heat affected zone 256 that is affected by heat are formed in the welded portion 250. In such an embodiment, the nugget zone 252 is formed approximate to where the terminal protrusion 235 is fitted in the support groove 265.

While this invention has been described in connection with what is presently considered to be practical exemplary embodiments, it is to be understood that the invention is not limited to the disclosed embodiments, but is instead intended to cover various modifications and equivalent arrangements included within the spirit and scope of the appended claims.

What is claimed is:

1. A battery module comprising:
    a plurality of rechargeable batteries; and
    a connector for connecting a first terminal of one of the plurality of rechargeable batteries to a second terminal of another one of the plurality of rechargeable batteries, the first terminal of the one of the batteries comprising a first material and the second terminal of the another one of the batteries comprising a second material different from the first material,
    wherein welded portions connect the connector to the first terminal and the second terminal, respectively, and wherein at least one of the welded portions is formed by friction stir welding and comprises a nugget zone comprising a mixture of the respective materials of the connector and a corresponding one of the first terminal or the second terminal.

2. The battery module of claim 1, wherein the first material comprises aluminum.

3. The battery module of claim 1, wherein the second material comprises copper.

4. The battery module of claim 1, wherein the connector comprises the first material or the second material.

5. The battery module of claim 1, wherein the welded portions comprise at least one spot weld connecting the connector to the first terminal and at least one more spot weld connecting the connector to the second terminal.

6. The battery module of claim 1, wherein the first terminal, the second terminal, and the connector are plate shaped.

7. The battery module of claim 1, wherein the connector is positioned on the first terminal and the second terminal.

8. The battery module of claim 7, wherein the welded portions comprise spot welds formed from a side of the connector opposite a side facing the first terminal and the second terminal.

9. The battery module of claim 7, wherein the connector is in contact with the first terminal and the second terminal, and the welded portions are each formed in a line where the connector and one of the first terminal or the second terminal are in contact.

10. The battery module of claim 1, wherein at least one of the first terminal or the second terminal comprises a protrusion, and the connector comprises a groove sized to receive the protrusion.

11. The battery module of claim 10, wherein the welded portions comprise spot welds formed from a side of the connector opposite a side facing the first terminal and the second terminal.

12. The battery module of claim 11, wherein a corresponding one of the spot welds is aligned with the protrusion and the corresponding groove.

13. The battery module of claim 12, wherein the nugget zone is formed by melding of the connector with the protrusion while in a solid state to form a melded portion, and dynamic recrystallization of the melded portion.

14. The battery module of claim 1, wherein the nugget zone is formed by melding of the connector with the corresponding one of the first terminal or the second terminal while in a solid state to form a melded portion, and dynamic recrystallization of the melded portion.

15. The battery module of claim 7, further comprising a thermo-mechanically affected zone around the nugget zone and formed by plastic deformation and partial recrystallization of the connector with the corresponding one of the first terminal or the second terminal, and a heat affected zone around the thermo-mechanically affected zone.

16. The battery module of claim 1, wherein the welded portions each comprises a surface and a welding groove recessed from the surface.

17. The battery module of claim 1, wherein the connector contacts the corresponding one of the first terminal or the second terminal, and wherein the nugget zone traverses the contacting surfaces between the connector and the corresponding one of the first terminal or the second terminal.

18. A method of connecting a first terminal of a first rechargeable battery with a second terminal of a second rechargeable battery, the method comprising:
    providing a connector comprising a material different than a material of one of the first terminal or the second terminal; and
    welding the connector to the first terminal and the second terminal, respectively, to form respective welded portions,
    wherein the welded portion between the connector and the one of the first terminal or the second terminal is formed by friction stir welding.

19. The method of claim 18, wherein the friction stir welding forms a nugget zone comprising a mixture of the respective materials of the connector and the one of the first terminal or the second terminal, by melding of the connector with the one of the first terminal or the second terminal while in a solid state to form a melded portion, and dynamic recrystallization of the melded portion.

* * * * *

UNITED STATES PATENT AND TRADEMARK OFFICE
CERTIFICATE OF CORRECTION

| | | |
|---|---|---|
| PATENT NO. | : 8,460,818 B2 | Page 1 of 1 |
| APPLICATION NO. | : 12/872252 | |
| DATED | : June 11, 2013 | |
| INVENTOR(S) | : Sung-Bae Kim et al. | |

It is certified that error appears in the above-identified patent and that said Letters Patent is hereby corrected as shown below:

In the Claims

Column 8, Claim 15, line 32    Delete "claim 7"
Insert -- claim 14 --

Signed and Sealed this
Eighth Day of July, 2014

Michelle K. Lee
*Deputy Director of the United States Patent and Trademark Office*